(12) United States Patent
Alattar

(10) Patent No.: US 8,300,274 B2
(45) Date of Patent: *Oct. 30, 2012

(54) PROCESS FOR MARKING SUBSTRATES WITH INFORMATION USING A TEXTURE PATTERN AND RELATED SUBSTRATES

(75) Inventor: Adnan M. Alattar, Tigard, OR (US)

(73) Assignee: Digimarc Corporation, Beaverton, OR (US)

(*) Notice: Subject to any disclaimer, the term of this patent is extended or adjusted under 35 U.S.C. 154(b) by 28 days.

This patent is subject to a terminal disclaimer.

(21) Appl. No.: 12/236,307

(22) Filed: Sep. 23, 2008

(65) Prior Publication Data

US 2009/0080758 A1    Mar. 26, 2009

Related U.S. Application Data

(63) Continuation of application No. 11/419,718, filed on May 22, 2006, now Pat. No. 7,427,334, which is a continuation of application No. 10/642,451, filed on Aug. 14, 2003, now Pat. No. 7,050,201, which is a continuation of application No. 09/515,545, filed on Feb. 29, 2000, now Pat. No. 6,608,919, which is a continuation-in-part of application No. 09/437,357, filed on Nov. 10, 1999, now abandoned.

(51) Int. Cl.
*G06K 19/06* (2006.01)
*B41M 3/10* (2006.01)
*B41M 3/14* (2006.01)
*D21F 11/00* (2006.01)

(52) U.S. Cl. ......... 358/3.28; 162/110; 162/140; 101/32; 235/494; 283/113

(58) Field of Classification Search .............. 358/1.9, 358/3.28, 3.29, 3.31; 382/100, 135, 137, 382/232; 380/51, 54, 55; 713/176; 430/306, 430/307; 101/3.1, 32, 150, 170, 368, 395; 235/487, 490, 494, 468; 283/72, 113; 162/109, 110, 140, 362

See application file for complete search history.

(56) References Cited

U.S. PATENT DOCUMENTS 3,569,619 A    3/1971    Simjian
(Continued)

FOREIGN PATENT DOCUMENTS

CA    2235002    12/1998
(Continued)

OTHER PUBLICATIONS

U.S. Appl. No. 60/000,442, filed Jun. 20, 1995, Hudetz.
(Continued)

*Primary Examiner* — Scott A Rogers

(57) ABSTRACT

The present invention provides processes to encode substrates (e.g., paper, synthetics, etc.) with information, and substrates including signals encoded therein. One claim recites a substrate-making process including: obtaining an element to be utilized in a substrate-making process, the element including a property to introduce a texture pattern including an encoded signal into a substrate, the encoded signal being machine-detectable from image data corresponding to at least a portion of the texture pattern, the encoded signal including a variable component; and utilizing the element to impart the texture pattern into a substrate during the substrate-making process. Another claim recites a physical substrate including: a surface having a texture pattern provided in the surface during a substrate-making process. The texture pattern includes a machine-readable signal that is detectable from image data corresponding to at least a portion of the texture pattern. The signal includes a variable component that has discernable properties in a frequency domain. The texture pattern is provided in the surface during the substrate-marking process by a non-printing element. Of course, other claims and combinations are also provided.

22 Claims, 1 Drawing Sheet

U.S. PATENT DOCUMENTS

| | | |
|---|---|---|
| 3,915,090 A | 10/1975 | Horst et al. |
| 3,984,624 A | 10/1976 | Waggener |
| 4,200,389 A | 4/1980 | Matsui et al. |
| 4,230,990 A | 10/1980 | Lert, Jr. et al. |
| 4,234,214 A | 11/1980 | Lee |
| 4,238,849 A | 12/1980 | Gassmann |
| 4,296,326 A | 10/1981 | Haslop et al. |
| 4,297,729 A | 10/1981 | Steynor et al. |
| 4,313,197 A | 1/1982 | Maxemchuk |
| 4,367,488 A | 1/1983 | Leventer et al. |
| 4,379,947 A | 4/1983 | Warner |
| 4,380,027 A | 4/1983 | Leventer et al. |
| 4,395,600 A | 7/1983 | Lundy et al. |
| 4,425,642 A | 1/1984 | Moses et al. |
| 4,528,588 A | 7/1985 | Lofberg |
| 4,547,804 A | 10/1985 | Greenberg |
| 4,586,431 A | 5/1986 | Calman |
| 4,588,212 A | 5/1986 | Castagnoli |
| 4,618,257 A | 10/1986 | Bayne et al. |
| 4,672,605 A | 6/1987 | Hustig et al. |
| 4,675,746 A | 6/1987 | Tetrick et al. |
| 4,677,435 A | 6/1987 | Causse D'Agraives et al. |
| 4,682,540 A | 7/1987 | Eastman et al. |
| 4,739,377 A | 4/1988 | Allen |
| 4,750,173 A | 6/1988 | Bluthgen |
| 4,807,031 A | 2/1989 | Broughton et al. |
| 4,846,578 A | 7/1989 | Morita et al. |
| 4,855,827 A | 8/1989 | Best |
| 4,879,747 A | 11/1989 | Leighton et al. |
| 4,888,798 A | 12/1989 | Earnest |
| 4,908,836 A | 3/1990 | Rushforth et al. |
| 4,908,873 A | 3/1990 | Philibert et al. |
| 4,910,688 A | 3/1990 | Amini |
| 4,944,036 A | 7/1990 | Hyatt |
| 4,947,028 A | 8/1990 | Gorog |
| 4,968,386 A | 11/1990 | Nguyen |
| 4,969,041 A | 11/1990 | O'Grady et al. |
| 4,971,646 A | 11/1990 | Schell et al. |
| 4,972,476 A | 11/1990 | Nathans |
| 4,977,594 A | 12/1990 | Shear |
| 5,023,907 A | 6/1991 | Johnson |
| 5,027,401 A | 6/1991 | Soltesz |
| 5,040,059 A | 8/1991 | Leberl |
| 5,053,956 A | 10/1991 | Donald |
| 5,062,666 A | 11/1991 | Mowry et al. |
| 5,091,966 A | 2/1992 | Bloomberg et al. |
| 5,094,718 A | 3/1992 | Friend |
| 5,095,196 A | 3/1992 | Miyata |
| 5,103,459 A | 4/1992 | Gilhousen et al. |
| 5,113,445 A | 5/1992 | Wang |
| 5,146,457 A | 9/1992 | Veldhuis et al. |
| 5,155,558 A | 10/1992 | Tannenbaum et al. |
| 5,181,786 A | 1/1993 | Hujink |
| 5,199,744 A * | 4/1993 | Shenton ............... 283/91 |
| 5,200,822 A | 4/1993 | Bronfin et al. |
| 5,213,337 A | 5/1993 | Sherman |
| 5,216,724 A | 6/1993 | Suzuki et al. |
| 5,243,423 A | 9/1993 | DeJean et al. |
| 5,259,025 A | 11/1993 | Monroe |
| 5,280,537 A | 1/1994 | Sugiyama et al. |
| 5,288,976 A | 2/1994 | Citron |
| 5,291,243 A | 3/1994 | Heckman et al. |
| 5,295,203 A | 3/1994 | Krause et al. |
| 5,313,256 A * | 5/1994 | Bov et al. ............... 392/2 |
| 5,315,098 A | 5/1994 | Tow |
| 5,321,470 A | 6/1994 | Hasuo et al. |
| 5,354,097 A * | 10/1994 | Tel ............... 283/72 |
| 5,374,976 A | 12/1994 | Spannenburg |
| 5,379,345 A | 1/1995 | Greenberg |
| 5,416,307 A | 5/1995 | Danek et al. |
| 5,428,607 A | 6/1995 | Hiller et al. |
| 5,428,731 A | 6/1995 | Powers |
| 5,449,200 A | 9/1995 | Andric et al. |
| 5,463,209 A | 10/1995 | Figh |
| 5,469,222 A | 11/1995 | Sprague |
| 5,469,506 A | 11/1995 | Berson et al. |
| 5,493,677 A | 2/1996 | Balogh |
| 5,495,581 A | 2/1996 | Tsai |
| 5,496,071 A | 3/1996 | Walsh |
| 5,502,576 A | 3/1996 | Ramsay et al. |
| 5,521,722 A | 5/1996 | Colvill et al. |
| 5,524,933 A | 6/1996 | Kunt et al. |
| 5,530,759 A | 6/1996 | Braudaway et al. |
| 5,530,852 A | 6/1996 | Meske, Jr. et al. |
| 5,568,550 A | 10/1996 | Ur |
| 5,582,103 A * | 12/1996 | Tanaka et al. ............... 101/32 |
| 5,583,614 A | 12/1996 | Hasuo |
| 5,583,639 A | 12/1996 | Hasuo |
| 5,583,950 A | 12/1996 | Prokoski |
| 5,594,226 A | 1/1997 | Steger |
| 5,598,526 A | 1/1997 | Daniel et al. |
| 5,613,004 A | 3/1997 | Cooperman et al. |
| 5,617,119 A | 4/1997 | Briggs et al. |
| 5,636,292 A | 6/1997 | Rhoads |
| 5,636,565 A * | 6/1997 | Lawrance et al. ............... 101/32 |
| 5,638,443 A | 6/1997 | Stefik |
| 5,640,193 A | 6/1997 | Wellner |
| 5,646,999 A | 7/1997 | Saito |
| 5,652,626 A | 7/1997 | Kawakami et al. |
| 5,659,164 A | 8/1997 | Schmid |
| 5,663,766 A | 9/1997 | Sizer, II |
| 5,664,018 A | 9/1997 | Leighton |
| 5,665,951 A | 9/1997 | Newman et al. |
| 5,668,636 A | 9/1997 | Beach et al. |
| 5,671,282 A | 9/1997 | Wolff et al. |
| 5,673,316 A | 9/1997 | Auerbach et al. |
| 5,687,236 A | 11/1997 | Moskowitz et al. |
| 5,710,636 A | 1/1998 | Curry |
| 5,719,939 A | 2/1998 | Tel |
| 5,721,583 A | 2/1998 | Harada et al. |
| 5,721,788 A | 2/1998 | Powell et al. |
| 5,722,693 A * | 3/1998 | Wicker ............... 283/67 |
| 5,727,092 A | 3/1998 | Sandford, II et al. |
| 5,735,547 A | 4/1998 | Morelle et al. |
| 5,740,244 A | 4/1998 | Indeck et al. |
| 5,740,276 A | 4/1998 | Tomko et al. |
| 5,742,845 A | 4/1998 | Wagner |
| 5,745,604 A | 4/1998 | Rhoads |
| 5,761,686 A | 6/1998 | Bloomberg |
| 5,768,426 A | 6/1998 | Rhoads |
| 5,772,248 A * | 6/1998 | Phillips ............... 283/91 |
| 5,778,102 A | 7/1998 | Sandford, II et al. |
| 5,790,693 A | 8/1998 | Graves et al. |
| 5,790,697 A | 8/1998 | Munro et al. |
| 5,804,803 A | 9/1998 | Cragun et al. |
| 5,809,160 A | 9/1998 | Powell et al. |
| 5,809,317 A | 9/1998 | Kogan et al. |
| 5,815,198 A | 9/1998 | Vachtsevanos et al. |
| 5,817,205 A * | 10/1998 | Kaule ............... 162/140 |
| 5,818,441 A | 10/1998 | Throckmorton et al. |
| 5,819,289 A | 10/1998 | Sanford, II et al. |
| 5,822,436 A | 10/1998 | Rhoads |
| 5,825,871 A | 10/1998 | Mark |
| 5,825,892 A * | 10/1998 | Braudaway et al. ............ 380/51 |
| 5,835,639 A | 11/1998 | Honsinger et al. |
| 5,838,458 A | 11/1998 | Tsai |
| 5,841,978 A | 11/1998 | Rhoads |
| 5,848,144 A | 12/1998 | Ahrens |
| 5,848,413 A | 12/1998 | Wolff |
| 5,850,481 A | 12/1998 | Rhoads |
| 5,852,673 A | 12/1998 | Young |
| 5,857,038 A | 1/1999 | Owada et al. |
| 5,862,218 A | 1/1999 | Steinberg |
| 5,862,260 A | 1/1999 | Rhoads |
| 5,869,819 A | 2/1999 | Knowles et al. |
| 5,871,615 A * | 2/1999 | Harris ............... 162/140 |
| 5,872,589 A | 2/1999 | Morales |
| 5,875,249 A | 2/1999 | Mintzer et al. |
| 5,893,101 A | 4/1999 | Balogh et al. |
| 5,898,779 A | 4/1999 | Squilla et al. |
| 5,900,608 A | 5/1999 | Iida |
| 5,902,353 A | 5/1999 | Reber et al. |
| 5,903,729 A | 5/1999 | Reber et al. |
| 5,905,248 A | 5/1999 | Russell et al. |
| 5,905,251 A | 5/1999 | Knowles |
| 5,905,810 A | 5/1999 | Jones et al. |
| 5,912,972 A | 6/1999 | Barton |

| | | |
|---|---|---|
| 5,913,210 A | 6/1999 | Call |
| 5,915,027 A | 6/1999 | Cox et al. |
| 5,930,767 A | 7/1999 | Reber et al. |
| 5,932,863 A | 8/1999 | Rathus et al. |
| 5,933,798 A | 8/1999 | Linnartz |
| 5,933,829 A | 8/1999 | Durst et al. |
| 5,938,726 A | 8/1999 | Reber et al. |
| 5,938,727 A | 8/1999 | Ikeda |
| 5,939,695 A | 8/1999 | Nelson |
| 5,940,595 A | 8/1999 | Reber et al. |
| 5,949,055 A | 9/1999 | Fleet et al. |
| 5,950,173 A | 9/1999 | Perkowski |
| 5,951,055 A | 9/1999 | Mowry, Jr. |
| 5,963,916 A | 10/1999 | Kaplan |
| 5,971,277 A | 10/1999 | Cragun et al. |
| 5,974,141 A | 10/1999 | Saito |
| 5,974,548 A | 10/1999 | Adams |
| 5,978,773 A | 11/1999 | Hudetz et al. |
| 5,979,757 A | 11/1999 | Tracy et al. |
| 5,983,218 A | 11/1999 | Syeda-Mahmood |
| 5,991,426 A | 11/1999 | Cox et al. |
| 6,005,501 A | 12/1999 | Wolosewicz |
| 6,035,177 A | 3/2000 | Moses et al. |
| 6,052,486 A | 4/2000 | Knowlton et al. |
| 6,064,764 A | 5/2000 | Bhaskaran et al. |
| 6,106,021 A * | 8/2000 | Phillips ................ 283/113 |
| 6,122,403 A | 9/2000 | Rhoads |
| 6,148,091 A | 11/2000 | DiMaria |
| 6,166,750 A | 12/2000 | Negishi |
| 6,200,419 B1 | 3/2001 | Phan |
| 6,201,879 B1 | 3/2001 | Bender et al. |
| 6,252,963 B1 | 6/2001 | Rhoads |
| 6,266,430 B1 | 7/2001 | Rhoads et al |
| 6,282,300 B1 | 8/2001 | Bloom et al. |
| 6,285,776 B1 | 9/2001 | Rhoads |
| 6,311,214 B1 | 10/2001 | Rhoads |
| 6,321,648 B1 * | 11/2001 | Berson et al. .............. 101/32 |
| 6,324,573 B1 | 11/2001 | Rhoads |
| 6,334,678 B1 | 1/2002 | Daigneault et al. |
| 6,343,138 B1 | 1/2002 | Rhoads |
| 6,345,104 B1 | 2/2002 | Rhoads |
| 6,385,329 B1 | 5/2002 | Sharma et al. |
| 6,385,330 B1 | 5/2002 | Powell et al. |
| 6,417,968 B1 * | 7/2002 | Staub et al. ................ 359/567 |
| 6,427,020 B1 | 7/2002 | Rhoads |
| 6,449,377 B1 | 9/2002 | Rhoads |
| 6,505,160 B1 | 1/2003 | Levy et al. |
| 6,512,837 B1 | 1/2003 | Ahmed |
| 6,522,770 B1 | 2/2003 | Seder et al. |
| 6,522,771 B2 | 2/2003 | Rhoads |
| 6,546,112 B1 | 4/2003 | Rhoads |
| 6,549,638 B2 | 4/2003 | Davis et al. |
| 6,574,350 B1 | 6/2003 | Rhoads et al. |
| 6,577,746 B1 | 6/2003 | Evans et al. |
| 6,580,819 B1 | 6/2003 | Rhoads |
| 6,591,365 B1 | 7/2003 | Cookson |
| 6,608,919 B1 * | 8/2003 | Alattar ................ 382/135 |
| 6,650,761 B1 | 11/2003 | Rodriguez et al. |
| 6,659,508 B1 * | 12/2003 | Nemeth et al. ............. 283/93 |
| 6,674,886 B2 | 1/2004 | Davis et al. |
| 6,683,966 B1 | 1/2004 | Tian et al. |
| 6,694,041 B1 | 2/2004 | Brunk |
| 6,709,333 B1 | 3/2004 | Bradford et al. |
| 6,711,465 B2 | 3/2004 | Tomassi |
| 6,714,683 B1 | 3/2004 | Tian et al. |
| 6,724,912 B1 | 4/2004 | Carr et al. |
| 6,744,906 B2 | 6/2004 | Rhoads et al. |
| 6,748,533 B1 | 6/2004 | Wu et al. |
| 6,750,985 B2 * | 6/2004 | Rhoads ................ 358/3.28 |
| 6,788,800 B1 | 9/2004 | Carr et al. |
| 6,804,379 B2 | 10/2004 | Rhoads |
| 6,882,738 B2 | 4/2005 | Davis et al. |
| 6,926,203 B1 | 8/2005 | Sehr |
| 6,947,571 B1 | 9/2005 | Rhoads |
| 6,959,385 B2 | 10/2005 | Murakami et al. |
| 6,985,600 B2 | 1/2006 | Rhoads et al. |
| 6,987,861 B2 * | 1/2006 | Rhoads ................ 382/100 |
| 6,993,152 B2 | 1/2006 | Patterson et al. |
| 6,999,936 B2 | 2/2006 | Sehr |
| 7,024,563 B2 | 4/2006 | Shimosato et al. |
| 7,027,612 B2 | 4/2006 | Patterson et al. |
| 7,029,733 B2 * | 4/2006 | Gration et al. ................ 428/29 |
| 7,044,395 B1 | 5/2006 | Davis et al. |
| 7,050,201 B2 * | 5/2006 | Alattar ................ 358/3.28 |
| 7,055,034 B1 | 5/2006 | Levy |
| 7,068,809 B2 | 6/2006 | Stach |
| 7,076,084 B2 * | 7/2006 | Davis et al. ................ 382/100 |
| 7,130,087 B2 * | 10/2006 | Rhoads ................ 358/3.28 |
| 7,143,949 B1 | 12/2006 | Hannigan |
| 7,162,052 B2 | 1/2007 | Brundage et al. |
| 7,167,844 B1 | 1/2007 | Leong et al. |
| 7,185,201 B2 | 2/2007 | Rhoads et al. |
| 7,389,939 B2 | 6/2008 | Jones et al. |
| 7,403,633 B2 | 7/2008 | Brundage et al. |
| 7,427,334 B2 * | 9/2008 | Alattar ................ 162/110 |
| 7,483,177 B2 * | 1/2009 | Miyazaki et al. ............. 358/3.29 |
| 2001/0026377 A1 | 10/2001 | Ikegami |
| 2001/0042052 A1 | 11/2001 | Leon |
| 2001/0055258 A1 | 12/2001 | Carson et al. |
| 2002/0009208 A1 | 1/2002 | Alattar et al. |
| 2002/0032864 A1 | 3/2002 | Rhoads et al. |
| 2002/0054356 A1 | 5/2002 | Kurita et al. |
| 2002/0126889 A1 | 9/2002 | Pikler et al. |
| 2003/0026448 A1 | 2/2003 | Metois et al. |
| 2003/0145747 A1 | 8/2003 | Mayer et al. |
| 2003/0219145 A1 | 11/2003 | Smith |
| 2006/0104103 A1 | 5/2006 | Colineau et al. |
| 2007/0165208 A1 | 7/2007 | Cowburn et al. |
| 2009/0174910 A1 * | 7/2009 | Kuraki et al. ................ 358/3.28 |

FOREIGN PATENT DOCUMENTS

| | | |
|---|---|---|
| DE | 29433436 | 5/1981 |
| EP | 493 091 | 7/1992 |
| EP | 0789480 | 8/1997 |
| EP | 872995 | 10/1998 |
| EP | 0642060 | 4/1999 |
| EP | 1147495 | 10/2001 |
| GB | 2417592 | 3/2006 |
| WO | WO94/27228 | 11/1994 |
| WO | WO95/04665 | 2/1995 |
| WO | WO95/10813 | 4/1995 |
| WO | WO97/43736 | 11/1997 |
| WO | WO98/14887 | 4/1998 |
| WO | WO98/20642 | 5/1998 |
| WO | WO98/24050 | 6/1998 |
| WO | WO98/40823 | 9/1998 |
| WO | WO98/49813 | 11/1998 |
| WO | WO99/34277 | 7/1999 |
| WO | WO99/36876 | 7/1999 |
| WO | WO00/44131 | 7/2000 |
| WO | WO0045344 | 8/2000 |
| WO | WO 00/065541 | 11/2000 |
| WO | WO 01/80169 | 10/2001 |
| WO | WO 2005 088517 | 9/2005 |

OTHER PUBLICATIONS

U.S. Appl. No. 60/071,983, filed Jan. 20, 1998, Levy.
U.S. Appl. No. 60/114,725, filed Dec. 31, 1998, Levy.
U.S. Appl. No. 60/082,228, filed Apr. 16, 1998, Rhoads.
U.S. Appl. No. 60/116,641, filed Jan. 21, 1999, Cookson.
U.S. Appl. No. 60/141,763, filed Jun. 30, 1999, Davis.
U.S. Appl. No. 60/158,015, filed Oct, 6, 1999, Davis et al.
U.S. Appl. No. 60/198,138, filed Apr. 17, 2000, Alattar.
U.S. Appl. No. 09/342,971, Rodriguez et al.
U.S. Appl. No. 09/234,780, filed Jan. 20, 1999, Rhoads et al.
U.S. Appl. No. 09/292,569, filed Apr. 15, 1999, Rhoads et al.
U.S. Appl. No. 09/342,104, filed Jun. 29, 1999, Rodriguez et al.
U.S. Appl. No. 09/437,357, filed Nov. 10, 1999, Alattar.
U.S. Appl. No. 09/465,418, filed Dec. 16, 1999, Rhoads et al.
U.S. Appl. No. 09/562,517, filed May 1, 2000, Davis et al.
U.S. Appl. No. 09/567,405, filed May 8, 2000, Rhoads et al.
U.S. Appl. No. 09/574,726, filed May 18, 2000, Rhoads et al.
U.S. Appl. No. 09/619,264, filed Jul. 19, 2000, Kumar.
U.S. Appl. No. 09/631,409, filed Aug. 3, 2000, Brundage et al.
U.S. Appl. No. 09/670,115, filed Sep. 26, 2000, Rhoads et al.

U.S. Appl. No.09/679,261, filed Oct. 4, 2000, Davis et al.
U.S. Appl. No. 09/761, 349, filed Jan. 16, 2001, Rhoads.
U.S. Appl. No. 09/765,102, filed Jan. 17, 2001, Shaw.
Restriction Requirement dated Sep. 14, 2005; Amendment dated Oct. 5, 2005 all from U.S. Appl. No. 10/642,451.
Restriction Requirement dated Jul. 2, 2007; Amendment dated Jul. 23, 2007; Office Action dated Aug. 14, 2007; Amendment dated Sep. 5, 2007; Final Office Action dated Nov. 8, 2007; Amendment dated Nov. 14, 2007; Office Action dated Dec. 20, 2007; Amendment Feb. 28, 2008 all from U.S. Appl. No. 11/419,718.
Office Action dated Jul. 12, 2001; Response dated Oct. 12, 2001; Final Office Action dated Dec. 5, 2001; Amendment After Final dated Jan. 30, 2002; Amendment Accompanying RCE dated Mar. 28, 2002; Office Action dated May 21, 2002; Amendment dated Nov. 12, 2002 all from U.S. Appl. No. 09/515,545.
Audio Watermarking Architectures for Secure Digital Music Distribution, A Proposal to the SDMI Portable Devices Working Group by ARIS Technologies, Inc. Mar. 26, 1999, pp. 1-11.
Audio Watermarking Architectures for Persistent Protection, Presentation to SDMI PDWG, Mar. 29, 1999, J. Winograd, Aris Technologies, pp. 1-16.
Audio Watermarking System to Screen Digital Audio Content for LCM Acceptance, A Proposal Submitted in Response to PDWG9905054-Transition C function P by ARIS Technologies, Inc., May 23, 1999, Document Version 1.0, 15 pages.
Boland et al., "Watermarking Digital Images for Copyright Protection", Fifth Int'l Conference on Image Processing and it's Application, Jul. 1995, pp. 326-330. Brassil et al., Electronic Marking and Identification Techniques to Discourage Document Copying, Proceedings of INFOCOM '94 Conference on Computer, IEEE Commun. Soc Conference, Jun. 12-16, 1994, 1278-1287.
Bruckstein, A.M.; Richardson, T.J., A holographic transform domain image watermarking method, Circuits, Systems, and Signal Processing vol. 17, No. 3 p. 361-389, 1998. This paper includes an appendix containing an internal memo of Bell Labs, which according to the authors of the paper, was dated Sep. 1994.
Cookson, Chris, General Principles of Music Uses on Portable Devices, presented to SDMI, Mar. 5, 1999.
Dautzenberg, "Watermarking Images," Department of Microelectronics and Electrical Engineering, Trinity College Dublin, 47 pages, Oct. 1994.
Frequently Asked Questions About Digimarc Signature Technology, http://www.digimarc.com, Aug. 1995, 9 pages.
"High Water FBI Limited Presentation Image Copyright Protection Software," FBI Ltd brochure, Jul. 1995, 17 pages.
Koch et al., "Copyright Protection for Multimedia Data," Fraunhofer Institute for Computer Graphics, Dec. 16, 1994, 15 pages.
Koch et al., "Towards Robust and Hidden Image Copyright Labeling," Proc. of 1995 IEEE Workshop on Nonlinear Signal and Image Processing, Jun. 20-22, 1995, 4 pages.
Kurak et al., "A Cautionary Note On Image Downgrading," 1992 IEEE, pp. 153-159.

Levy, "AIPL's Proposal for SDMI: An Underlying Security System" (slide presentation), Mar. 29, 1999, 23 slides.
Microsoft Response to C.function.P for Technology Solutions to Screen Digital Audio Content for LCM Acceptance, SDMI, PDWG Tokyo, May 23, 1999, 9 pages.
Mintzer et al., "Safeguarding Digital library Contents and Users Digital Watermarking," D-Lib Magazine, Dec. 1997: ISSN 1082-9873.
O'Ruanaidh et al., "Rotation, Scale and translation Invariant Digital Image Watermarking," Int. Conf. on Image Proc., Oct. 1997 *IEEE, pp. 536-539.
Rindfrey, "Towards an Equitable System for Access Control and Copyright Protection in Broadcast Image Services: The Equicrypt Approach," Intellectual Property Rights and New Technologies, Proc. of the Conference, R. Oldenbourg Verlag Wien Munchen 1995, 12 pages.
Sandford II et al., "The Data Embedding Method", Proceedings of the SPIE vol, 2615, pp. 226-259, 1996.
Schreiber et al., "A Compatible High-Definition Television System Using the Noise-Margin Method of Hiding Enhancement Information," SMPTE Journal, Dec. 1989, pp. 873-879.
SDMI Example Use Scenarios (Non-Exhaustive), Version 1.2, Jun. 16, 1999.
Szepanski, "Additive Binary Data Transmission for Video Signals" Papers Presented at Conf. Of Comm. Engineering Soc. Sep. 30-Oct. 3, 1980, Technical Reports vol. 74, pp. 342-352.
Szepanski, W., "A Signal Theoretic Method For Creating Forgery-Proof Documents for Automatic Verification", 1979 Carnahan Conference on Crime Countermeasures, May 16-18, 1979, pp. 101-109.
Tanaka et al., "A Visual Retrieval System with Private Information for Image Database," Proceeding International Conference on DSP Applications and Technology, Oct. 1991, pp. 415-421.
Tanaka et al., "New Integrated Coding Schemes for Computer-Aided Facsimile," Proc. IEEE Int'l Conf. on Sys. Integration, Apr. 1990, pp. 275-281.
Thomas, Screening Technology for Content from Compact Discs, May 24, 1999, 11 pages.
Tirkel et al, "Electronic Water Mark," DICTA-93, Macquarie University, Sydney, Australia, Dec. 1993, pp. 666-673.
Vidal et al., "Non-Noticeable Information Embedding in Color Images: Marking and Detection", IEEE 1999, pp. 293-297.
Weber et al., "Correlative Image Registration," Seminars in Nuclear Medicine, vol. XXIV, No. 4, Oct. 1994, pp. 311-323.
Winograd, J.M., "Audio Watermarking Architecture for Secure Digital Music Distribution," a Proposal to the SDMI Portable Devices Working Group, by Aris Technologies, Inc., Mar. 26, 1999.
International Search Report for PCT/US00/30694, mailed Mar. 19, 2001.
International Preliminary Examination Report for PCT/US00/30694, dated Dec. 13, 2001.

* cited by examiner

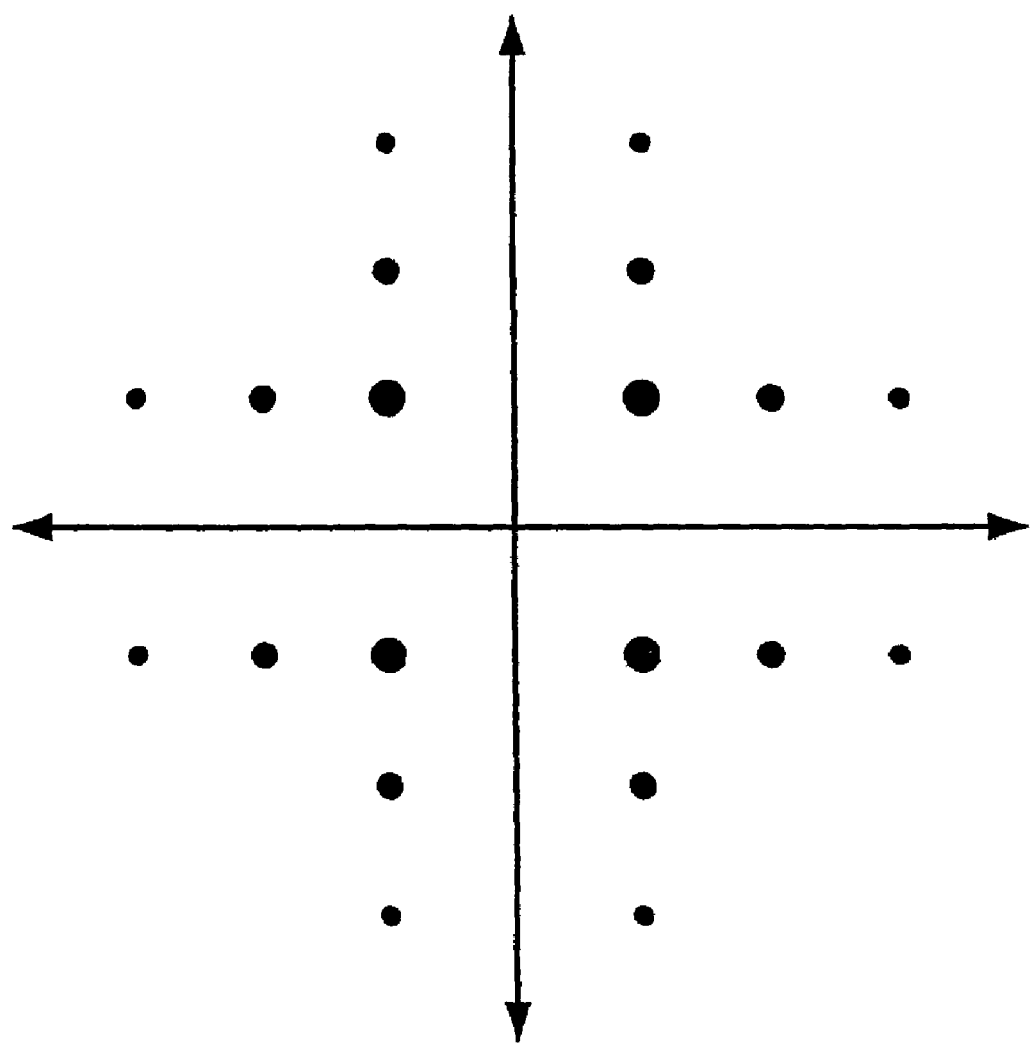

PROCESS FOR MARKING SUBSTRATES WITH INFORMATION USING A TEXTURE PATTERN AND RELATED SUBSTRATES

RELATED APPLICATION DATA

This application is a continuation of U.S. patent application Ser. No. 11/419,718, filed May 22, 2006 (U.S. Pat. No. 7,427,334), which is a continuation of U.S. patent application Ser. No. 10/642,451, filed Aug. 14, 2003 (U.S. Pat. No. 7,050,201). The Ser. No. 10/642,451 application is a continuation of U.S. patent application Ser. No. 09/515,545, filed Feb. 29, 2000 (U.S. Pat. No. 6,608,919), which is a continuation-in-part of U.S. patent application Ser. No. 09/437,357 (now abandoned), filed Nov. 10, 1999.

FIELD OF THE INVENTION

The present invention relates to paper-making, and more particularly relates to techniques useful in encoding information in paper during its formation.

BACKGROUND AND SUMMARY OF THE INVENTION

Digital watermarking is a burgeoning science with an extensive literature. Some of it, by the present assignee, relates to texturing the surface of a paper to convey optically-detectable digital information.

The assignee's U.S. Pat. No. 5,850,481, for example, details how the microtopology of a paper can be shaped, e.g., by a Braille-like machine, to encode digital data. The assignee's application Ser. No. 09/127,502 (U.S. Pat. No. 6,345,104) details how the high-pressures used in intaglio printing can be used to similar effect.

In accordance with a preferred embodiment of the invention, paper is textured during the paper-making process, rather than in a subsequent process, thereby affording various advantages. The texture yields a known signature when transformed to the frequency domain. This signature can be used for various purposes, including determining the angular orientation of the paper when scanned and analyzed for the presence of watermark data, and for simple document recognition purposes (e.g., photocopiers that refuse to reproduce banknotes). One way of effecting the desired texturing is by shaping the surface of a de-watering element accordingly.

The foregoing and additional features of the present invention will be more readily apparent from the following detailed description, which proceeds with reference to the accompanying drawings.

BRIEF DESCRIPTION OF THE DRAWINGS

FIG. 1 shows the frequency spectrum attributed to surface texture of a banknote paper.

DETAILED DESCRIPTION

On optical scanning of an existing banknote, it was found that that the image data had components that were not attributable to the artwork printed on the note. Rather, further examination found that texturing left during the paper-making process had a pattern that appeared—when transformed into the frequency domain by a FFT process—as a well defined array of spectral impulses (FIG. 1). This spectrum of this particular note had the appearance of a 2-dimensional sampled sync function. (The size of the points in FIG. 1 signifies amplitude of the corresponding frequency component; each is an impulse.)

In the digital watermarking field, subliminal frequency domain patterns are sometimes deliberately inserted into images to serve as calibration signals by which scale, rotation, and offset can be computer-determined. (See, e.g., the assignee's U.S. Pat. No. 5,862,260.) Instead of adding such a pattern during printing, the patterns formed during paper-making might alternatively be used.

In accordance with one embodiment of the present invention, the printing on a paper is oriented so as to align in a predetermined manner with the texture markings on the paper surface. For example, the printing process can be tightly integrated with the paper-making process so that the orientation of the printing applied to the paper coincides in the desired manner with the paper texture. In a related embodiment, the paper-making and printing processes are not tightly integrated, but the paper is formed or cut so that its edges correspond in a known relationship to the texture pattern on the paper surface. By such arrangement, careful alignment of the paper's edge with a reference during later printing can assure that the image is oriented in the desired manner with the substrate texture. In still another embodiment, the paper is scanned just before printing, and the resulting data is processed so as to determine orientation of the texture signal. Printing is then oriented relative to the paper in the desired manner.

When a document printed by such a technique is thereafter placed on the platen of a scanner and scanned, the resulting image data is of uncertain rotation. The scan data can be converted to a frequency domain (e.g., by the FFT), and the known frequency pattern due to the paper texture can then be used as a calibration signal permitting the rotational state of the image data to be determined. Decoding of the watermark can then proceed once the rotation is known. (In some watermarking systems, scale and/or offset may also need to be determined. However, their determination is facilitated by knowledge of rotation. Moreover, the frequency domain signal may result in some ambiguity in the document orientation, e.g., rotations beyond 180 degrees may appear as rotations in the range 0-180 degrees. Such cases can be resolved through other means.)

As is familiar to those skilled in the art, paper is typically formed by depositing a layer of pulp slurry on a planar or cylindrical surface, extracting the water from the pulp, and drying. The middle step, sometimes known as de-watering, can be performed using various structures. Porous ceramic rollers are used in some processes, with a vacuum applied to the inside of the roller that serves to draw water away from the wet layer, through the pores, and to the inside of the roller. Other processes involve meshes or screens through which water is drawn from the pulp. The surfaces of such de-watering structures can be textured to impart a complementary texture (and a corresponding frequency-domain signal) to the paper.

In particular, a desired frequency domain signal can first be defined. The signal can be comprised of one or more impulses in the frequency domain, or can be spread across the spectrum. (The signal shown in FIG. 29A of U.S. Pat. No. 5,862,260 is exemplary of a suitable signal.) This signal is then inverse-transformed into the spatial domain, and the de-watering element then shaped in accordance with the resulting pattern.

In many embodiments, the frequency domain signal is manifested as a fine continuous "weave"-like pattern in the spatial domain. In other embodiments, pseudo-random patterns can be used. If desired, certain discrete markings in the spatial domain can also be provided on the de-watering element surface to provide additional functionality in the texture signal (e.g., permitting image translation to be determined in addition to image rotation).

In other embodiments, the frequency domain signal effected by the texturing does not serve as a calibration adjunct to another signal (e.g., a watermark signal). Rather, the frequency domain signal is employed alone. One application is in simple document recognition. For example, a photocopier may be arranged to look for the frequency domain signature characteristic of the texturing associated with banknote paper and, if detected on a document-to-be-copied, refuse to copy. (An example of another banknote sensing photocopier, albeit one that looks for a pattern in the printing on the document rather than in the paper texture, is shown in Canon's U.S. Pat. No. 5,583,614.) The texturing may be arbitrarily complex so as to reduce false triggering of such a detector.

In still other embodiments, the texturing can convey a plural-bit watermark payload. For example, the presence or absence of different frequency-domain components can signal "1" or "0" bits. Many other such arrangements will be apparent.

To provide a comprehensive disclosure without unduly lengthening this specification, applicant incorporates by reference the patents and applications cited above.

Having described an illustrated the principles of my invention with reference to specific embodiments, it will be recognized that the principles thereof can be implemented in many other, different, forms. For example, while the detailed embodiment discussed use of the FFT transform, the patterns formed during paper-making can likewise be discerned in other transform domains. Similarly, while a de-watering element was particularly noted as suitable for texturing, other elements in a paper-making apparatus can be alternatively be textured with similar effect. Still further, while the invention was illustrated with reference to conventional "paper," the principles thereof are equally applicable to other printable media, including plastic and the material marketed by DuPont under the brand name Tyvek. Yet further, while the illustrated embodiment textured the paper during its formation, post-formation texturing—as detailed in the assignee's other patents/applications—can be used in the particular applications above-detailed (e.g., to determine image rotation, for simple document recognition, etc.).

Moreover, the particular combinations of elements and features in the above-detailed embodiments are exemplary only; the interchanging and substitution of these teachings with other teachings in this and the incorporated-by-reference patents/applications are also contemplated.

I claim:

1. A substrate-making process comprising:
    configuring a substrate-making element with a property that introduces a texture pattern into a substrate, wherein the texture pattern comprises a signal that is machine-detectable from image data corresponding to at least a portion of the texture pattern, wherein the signal comprises a variable component, and wherein the substrate-making element comprises a de-watering element; and
    using the substrate-making element to impart the texture pattern into a substrate during the substrate-making process.

2. The process of claim 1, wherein the variable component comprises properties that are discernable in a frequency-domain.

3. The process of claim 2, wherein the property provides calibration information that is used when machine-detecting the signal from the texture pattern.

4. The process of claim 3, wherein the calibration information comprises rotation, scale or translation information used when machine-detecting the signal.

5. The process of claim 1, wherein the variable component conveys plural-bit data.

6. The process of claim 1, wherein frequency-domain properties convey at least one bit value of "1" or "0."

7. The process of claim 1, wherein the signal is steganographically hidden in the texture pattern.

8. The process of claim 1, wherein the signal comprises at least one frequency domain impulse.

9. The process of claim 1, wherein the signal comprises both spatial domain and frequency domain properties.

10. The process of claim 1, wherein the substrate comprises at least one substrate from a group of substrates comprising paper, plastic, Tyvek, and synthetics.

11. The substrate-making process of claim 1, further comprising:
    scanning the substrate to determine an orientation of the texture pattern.

12. The substrate-making process of claim 11, further comprising:
    printing on the substrate after the substrate is scanned such that the orientation of a printing aligns in a predetermined manner with the texture pattern.

13. A physical substrate comprising:
    a surface comprising a texture pattern provided in the surface during a substrate-making process, wherein the texture pattern comprises a machine-readable signal that is detectable from image data corresponding to at least a portion of the texture pattern, wherein the signal comprises a variable component comprising discernable properties in a frequency domain, wherein the texture pattern is provided in the surface during the substrate-making process by a non-printing element, and wherein the non-printing element comprises a de-watering element.

14. The substrate of claim 13, wherein the properties provide calibration information that is to be utilized when machine-reading the signal.

15. The substrate of claim 14, wherein the calibration information comprises rotation, scale or translation information.

16. The substrate of claim 13, wherein the variable component conveys plural-bit data.

17. The substrate of claim 13, wherein frequency-domain properties conveys at least one bit value of "1" or "0."

18. The substrate of claim 13, wherein the signal is steganographically hidden in the texture pattern.

19. The substrate of claim 13, wherein the signal comprises at least one frequency domain impulse.

20. The substrate of claim 13, wherein the signal comprises both spatial domain and frequency domain properties.

21. The substrate of claim 13, wherein the surface comprises at least one of paper, plastics, Tyvek, or synthetics.

22. A substrate-making template comprising:
    a texture pattern configured to impart a signal into a substrate during a substrate-making process, wherein the signal is machine-detectable from image data corresponding to at least a portion of the texture pattern, wherein the signal includes a variable component, and wherein the texture pattern is introduced during the substrate-making process using a de-watering element.

* * * * *

UNITED STATES PATENT AND TRADEMARK OFFICE
CERTIFICATE OF CORRECTION

PATENT NO. : 8,300,274 B2
APPLICATION NO. : 12/236307
DATED : October 30, 2012
INVENTOR(S) : Alattar It is certified that error appears in the above-identified patent and that said Letters Patent is hereby corrected as shown below:

On Page 4, in Field (56), under "OTHER PUBLICATIONS", in Column 1, Line 18, delete "Inc." and insert -- Inc., --, therefor.

On Page 4, in Field (56), under "OTHER PUBLICATIONS", in Column 1, Lines 28-31, delete "Brassil et al., Electronic Marking and Identification Techniques to Discourage Document Copying, Proceedings of INFOCOM '94 Conference on Computer, IEEE Commun. Soc Conference, Jun. 12-16, 1994, 1278-1287." and insert -- Brassil et al., "Electronic Marking and Identification Techniques to Discourage Document Copying," Proceedings of INFOCOM '94 Conference on Computer, IEEE Commun. Soc. Conference, Jun. 12-16, 1994, 1278-1287. --, at Line 29, as a new entry.

On Page 4, in Field (56), under "OTHER PUBLICATIONS", in Column 1, Line 32, delete "T.J., A" and insert -- T.J., "A --, therefor.

On Page 4, in Field (56), under "OTHER PUBLICATIONS", in Column 1, Lines 33-34, delete "Processing vol. 17, No. 3" and insert -- Processing," vol. 17, No. 3, --, therefor.

On Page 4, in Field (56), under "OTHER PUBLICATIONS", in Column 2, Line 1, delete "System""" and insert -- System," --, therefor.

On Page 4, in Field (56), under "OTHER PUBLICATIONS", in Column 2, Line 18, delete "SPIE vol, 2615," and insert -- SPIE, vol. 2615, --, therefor.

On Page 4, in Field (56), under "OTHER PUBLICATIONS", in Column 2, Line 24, delete "Signals""" and insert -- Signals," --, therefor.

On Page 4, in Field (56), under "OTHER PUBLICATIONS", in Column 2, Line 25, delete "Soc." and insert -- Soc., --, therefor.

Signed and Sealed this
Second Day of April, 2013

Teresa Stanek Rea
*Acting Director of the United States Patent and Trademark Office*

CERTIFICATE OF CORRECTION (continued)
U.S. Pat. No. 8,300,274 B2

On Page 4, in Field (56), under "OTHER PUBLICATIONS", in Column 2, Line 26, delete "Reports" and insert -- Reports, --, therefor.

On Page 4, in Field (56), under "OTHER PUBLICATIONS", in Column 2, Line 36, delete "Screening Technology for Content from Compact Discs," and insert -- "Screening Technology for Content from Compact Discs," --, therefor.

On Page 4, in Field (56), under "OTHER PUBLICATIONS", in Column 2, Line 38, delete "al," and insert -- al., --, therefor.

In Column 1, Line 53, delete "DRAWINGS" and insert -- DRAWING --, therefor.

In Column 4, Line 49, in Claim 17, delete "conveys" and insert -- convey --, therefor.

In Column 4, Line 57, in Claim 21, delete "plastics," and insert -- plastic, --, therefor.